United States Patent [19]

Schwab et al.

[11] 3,839,223

[45] Oct. 1, 1974

[54] STEAM REFORMING GASEOUS HYDROCARBONS

[75] Inventors: Willi Schwab, Limburgerhof; Wilhelm Karl Schropp, Luetzelsachsen, both of Germany

[73] Assignee: Badische Anilin- & Soda-Fabrik Aktiengesellschaft, Ludwigshafen/Rhine, Germany

[22] Filed: Feb. 23, 1971

[21] Appl. No.: 118,197

[30] Foreign Application Priority Data

Feb. 26, 1970 Germany.............................. 2008936

[52] U.S. Cl............. 252/373, 48/196 R, 252/466 J
[51] Int. Cl............................................... C01b 1/18
[58] Field of Search......... 252/373, 466 J; 48/196 R

[56] References Cited
UNITED STATES PATENTS

| 3,271,325 | 9/1966 | Davies et al. | 252/373 UX |
| 3,340,012 | 9/1967 | Moehl | 252/466 J |
| 3,342,751 | 9/1967 | Hayes | 252/466 J |
| 3,359,215 | 12/1967 | Reitmeier | 252/466 J |
| 3,363,988 | 1/1968 | Hayes | 252/466 J |
| 3,379,499 | 4/1968 | Moehl | 252/466 J |
| 3,394,086 | 7/1918 | Taylor | 252/373 |
| 3,445,402 | 5/1969 | Reitmeier | 252/466 J |
| 3,567,411 | 3/1971 | McMahon | 252/373 X |

FOREIGN PATENTS OR APPLICATIONS

| 1,492,926 | 10/1968 | France | 252/373 |
| 1,559,218 | 1/1969 | France | 252/373 |
| 820,257 | 9/1959 | Great Britain | 252/373 |
| 1,099,454 | 1/1968 | Great Britain | 252/373 |
| 791,623 | 8/1968 | Canada | 252/373 |

*Primary Examiner*—Howard T. Mars
*Attorney, Agent, or Firm*—Johnston, Keil Thompson & Shurtleff

[57] ABSTRACT

A process for cracking hydrocarbons with steam in the presence of specially prepared nickel catalysts. These catalysts contain substantially finely particled α-aluminum oxide as a support with small additions of activators and are formulates with binders devoid of silicic acid, such as aluminous cement.

8 Claims, No Drawings

STEAM REFORMING GASEOUS HYDROCARBONS

It is known that gaseous hydrocarbons, particularly methane or natural gas, can be cracked into hydrogen-containing gas with steam with or without carbon dioxide and/or oxygen-containing gas at temperatures of from 500° to 1,000°C and at pressures of up to 50 atmospheres over catalysts which contain as active components metals of subgroup 8 of the Periodic System, particularly nickel. Catalysts suitable for this purpose have to be thermostable at temperatures above 1,100°C and have to exhibit adequately high mechanical strength. Furthermore, such a catalyst should rapidly achieve its full activity after it has been brought to the operating temperature and should not require troublesome and time-consuming reduction with hydrogen. Moreover it is important that the catalyst should retain its activity over a long period and should not shrink at high temperatures because otherwise the reaction chamber has to be filled again during operation.

Many catalysts having various supports, particularly with aluminum silicates, usually in conjunction with aluminum oxide and magnesium oxide, have been described for steam reforming. Compaction is carried out almost exclusively be means of hydraulic binders, as for example with aluminous cement.

It has now become evident that when such catalysts are used, especially at the higher pressures and starting temperatures which have been used recently, difficulties arise by reason of silicic acid originating from the aluminum silicate being deposited in downstream portions of the apparatus. It has also become evident that although this defect can be obviated by omitting any components containing silicic acid, a marked decline in the mechanical strength of the catalysts is to be observed when a large amount of aluminum oxide is used as activator. It is not unusual for partial or complete disintegration of the catalyst rings or pellets to take place after only a short time. The cause of this is a decline in the bonding strength of the hydraulic binder by the withdrawal of water which takes place at higher temperatures and a decrease in strength during activation of the catalyst. Alterations in structure, such as occur for example in a transition of the aluminum oxide from the $\gamma$-modification into the $\alpha$-modification or in the dehydration of hydrated aluminum oxide, also play a part.

We have now found that in the steam reforming of gaseous hydrocarbons, particularly of methane, with or without the addition of carbon dioxide and/or an oxygen-containing gas over a catalyst containing cement as a binder and in which nickel is applied to a carrier devoid of silicic acid, at a temperature of more than 500°C and at a pressure of up to 50 atmospheres, the above disadvantages are overcome by using for the reaction a catalyst which contains from 12 to 30 percent of nickel, a fine-grained $\alpha$-aluminum oxide as carrier, an addition of 3 to 15 percent by weight of boehmite, hydrargillite or $\gamma$-aluminum oxide (calculated as $Al_2O_3$) as activator and 25 to 40 percent by weight of aluminous (high alumina) cement.

By fine-grained $\alpha$-aluminum oxides we mean products whose major proportion has a particle size of from 40 to 200 microns and is composed of granules of different sizes.

In accordance with the invention, the active composition is applied to the carrier by precipitation of nickel carbonate or basic nickel carbonate in the presence of activators such as boehmite, hydrargillite or $\gamma$-aluminum oxide. Application may for example be carried out by suspending the carrier and appropriate activator in an aqueous solution of a nickel salt with vigorous stirring and precipitating basic nickel carbonate with sodium carbonate solution. The composition is then filtered off, and the filter residue is washed until free from alkali, dried and roasted at 550°C to decompose the nickel carbonate.

Alternatively solid ammonium carbonate may be used instead of sodium carbonate solution for the precipitation in which case filtration and washing of the precipitate are dispensed with.

Joint precipitation of nickel carbonate and aluminum hydroxide also results in useful catalysts.

The composition which has been prepared by one of the said methods and which, after roasting, has substantially the same particle size as the carrier used, is mixed dry with aluminous cement practically devoid of silicate, water is added and after evaporation for 1 to 2 hours the product is brought into the desired shape with an addition of graphite, if desired after previous preliminary compaction and size reduction. Twenty-four hours later the moldings are soaked in water for a short time and advantageously kept in moist condition for at least eight days so that an additional increase in strength takes place.

The nickel content of the catalysts according to the invention may be varied within certain limits according to the desired activity; it amounts to 12 to 30 percent by weight, preferably 15 to 20 percent by weight, based on the total weight of the catalyst.

The amount of aluminum oxide used as activator is advantageously 25 to 50 percent by weight, preferably 30 percent by weight, of the amount of nickel, i.e., 3 to 15 percent by weight based on the total weight and calculated as $Al_2O_3$.

The content of $\alpha$-aluminum oxide as carrier is advantageously within the range from 15 to 35 percent by weight of the finished catalyst.

The aluminous cement practically devoid of silicates used as binder is used in an amount of from 25 to 40 percent by weight of the whole catalyst. The amount of mixing water used should correspond a water/cement awater/cement factor of from 0.35 to 0.45, advantageously 0.4.

The catalysts to be used according to the invention may be prepared in any of the forms conventionally use for cracking catalysts. Pellets or rings are generally preferred, solid pellets being particularly suitable for diameters of from 5 to 9 mm and rings, owing to their low pressure loss, for diameters of more than 9 mm, for example with an external diameter of 16 mm and an internal diameter of from 6 to 8 mm.

Catalysts prepared in this way have much better strength than prior art commercial catalysts both in the oxide condition and in the activated condition. Although initially a certain decline in strength takes place as a result of extraction of water during the increase in temperature and activation, as is the case with all cement catalysts, the residual strengths are far above the level necessary for reliable operation of the steam reforming plant.

Another advantage of the catalysts according to the invention is their low shrinkage which at 900°C is less than 0.5 percent by volume.

Furthermore the easy reducibility of the catalysts according to the invention is of special significance; it may be carried out with only steam and methane (without hydrogen) at temperatures of less than 600°C.

Cracking of gaseous hydrocarbons using the said catalysts is carried out under the conventional conditions for the process known in industry as steam reforming, i.e., at temperatures of from 500° to 900°C with the addition of steam in amount of about 1 to 5 moles, preferably 2 to 3 moles, per gram atom of carbon with or without carbon dioxide and at pressures of up to 50 atmospheres, preferably from 10 to 35 atmospheres.

Gaseous hydrocarbons suitable for steam reforming according to the invention are $C_1$ to $C_4$ hydrocarbons, particularly methane or gases containing methane such as natural gas or refinery gas.

Steam reforming according to the present invention may also be carried out with an addition or a small amount of gas containing oxygen, particularly air, as is usually done in the process known as secondary reforming for the production of ammonia synthesis gas.

The process according to the invenion is also suitable for cracking the rich gas obtained in low-temperature cracking of naphtha i.e., a gas having a high methane content, a second stage to form a gas having a higher content of hydrogen.

Cracked gas obtained by the process according to the invention may be used as town gas or as synthesis gas according to the conditions of the cracking and its content of hydrogen.

The following Examples illustrate the invention.

EXAMPLE 1

6.6 parts by weight of $Al_2O_3$ in the form of boehmite and 28.4 parts by weight of $\alpha$-$Al_2O_3$ having a particle size of 40 to 200 microngs are added to a 13 percent solution of nickel nitrate containing 25 parts by weight of NiO. While stirring vigorously, a 10 percent solution of sodium carbonate containing 38 parts by weight of $Na_2CO_3$ is slowly added and the whole is brought to the boil. The composition is filtered off, washed free from alkali and nitrate with deionized water, dried and roasted at 550°C for at least 12 hours. 60 parts by weight of the finely particled roasted material is premixed dry with 40 parts by weight of aluminous cement (for example a commercial product containing 71.5% of $Al_2O_3$, 26.4% of CaO less than 1% of $Fe_2O_3$ less than 1% of MgO, 0,07% of $SiO_2$ and less than 0.5% of alkali) about 40% of water (based on cement) is added and the whole is mixed. The moist material is allowed to stand in the air for about 1 hour, forced through a sieve having meshes 1.5 mm wide, mixed with 1.5 parts by weight of graphite and shaped (with or without previous compaction and size reduction to less than 1.5 mm) into rings measuring 16 mm × 16 mm c 8 mm. Twenty-four hours later, the moldings obtained in this way are wetted for 30 minutes and then kept moist for at least 8 days, advantageously in a closed vessel. They are allowed to dry for some days in air prior to use.

The catalyst prepared in this way has a nickel content of about 15 percent by weight and a front compressive strength which averages 990 kg/cm².

To test its activity, the catalyst is heated in a vertical externally heated reaction tube in an atmosphere of nitrogen at 600°C and at 5 atmospheres with steam and methane in a ratio by volume of 3:1. The activation which immediately commences can be detected by the increase in product gas and the decrease in the methane content. After a discharge temperature of 780°C has been reached, a residual methane content of 1.9 percent by volume is obtained at a loading of 2,000 liters (STP) of methane per liter of catalyst per hour. The front compressive strength of the catalyst determined in a test carried out under 30 atmospheres is an average of 470 kg/cm² after operation for 1,000 hours.

A commercial cement-bonded catalyst having 17 percent by weight of nickel and containing no $\alpha$-aluminum oxide gives the following values under the same operating conditions:
residual methane content: 2.0 percent by volume;
front compressive strength: 50 kg/cm² after 1,000 hours at 30 atmospheres.

EXAMPLE 2

8.7 parts by weight of $Al_2O_3$ in the form of boehmite (or hydrargillite and $\gamma$-$Al_2O_3$) and 18.3 parts by weight of $\alpha$-$Al_2O_3$ having a particle size range of from 40 to 200 microns are introduced into a 13 percent solution of nickel nitrate which contains 33 parts by weight of NiO. 46 parts by weight of powdered $(NH_4)_2CO_3$ is slowly added for precipitation. The pasty composition (whose consistency may if necessary be adjusted by adding water) is then dried by slow heating and decomposed for 12 hours at 550°C.

Further treatment is carried out as described in Example 1. A catalyst is obtained containing about 20 percent by weight of nickel; after 1,000 hours under the conditions specified in Example 1, it has a strength of 440 kg/cm².

The residual methane content is 1.8 percent by volume.

We claim:

1. In a process for the steam reforming of gaseous hydrocarbons which comprises passing a gaseous hydrocarbon and steam in a ratio of 1–5 mols of steam per gram atom of carbon in said hydrocarbon over a nickel catalyst containing aluminous cement as binder at temperatures of more than 500°C and pressures of up to 50 atmospheres, the improvement being wherein said catalyst consists essentially of 12 to 30 percent by weight of nickel, 15–35 percent by weight of a finely-particled $\alpha$-aluminum oxide as carrier, 3 to 15 percent by weight of boehmite, hydrargillite or $\gamma$-aluminum oxide (calculated as $Al_2O_3$) as activator and 25 to 40 percent by weight of aluminous cement, said percentages being based on the total weight of the catalyst.

2. A process as claimed in claim 1 wherein the major portion of $\alpha$-aluminum oxide has a particle size of from 40 to 200 microns and is composed of granules of different sizes.

3. A process as claimed in claim 1 wherein the catalyst is soaked in water for 30 minutes and stored for at least 8 days while moist.

4. A process as claimed in claim 1 wherein the nickel content of the catalyst is from 15 to 20 percent by weight.

5. A process as claimed in claim 1 wherein the amount of aluminum oxide used as activator is 30 percent by weight of the amount of nickel.

6. A process as claimed in claim 1 wherein said gaseous hydrocarbon is a $C_1$ to $C_4$ hydrocarbon, and said temperature is in the range of 500° to 900°C.

7. A process as claimed in claim 1 wherein said gaseous hydrocarbon is methane, and said temperature is in the range of 500° to 900°C.

8. A process as claimed in claim 1 wherein the required amount of nickel is applied to the carrier and activator by suspending said carrier and said activator in an aqueous solution of a water soluble nickel salt, vigorously stirring the suspension, adding sodium carbonate solution and precipitating basic nickel carbonate, filtering the resultant composition, washing the filter residue until it is free from alkali, drying the washed residue, and roasting the dried residue to decompose the nickel carbonate.

* * * * *